(No Model.)
J. K. QUICK.
CAN OPENER.
No. 565,564. Patented Aug. 11, 1896.
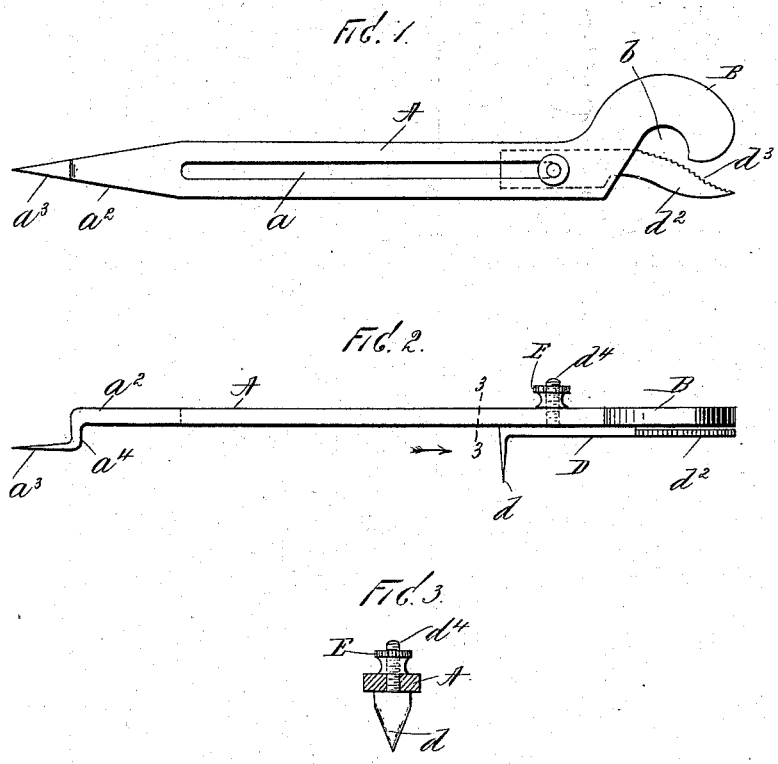
WITNESS:
John Buckler
C Gerst
INVENTOR
Jacob K. Quick,
BY
Edgar Tate & Co
ATTORNEYS.

UNITED STATES PATENT OFFICE.

JACOB K. QUICK, OF PORT JERVIS, NEW YORK.

CAN-OPENER.

SPECIFICATION forming part of Letters Patent No. 565,564, dated August 11, 1896.

Application filed April 29, 1896. Serial No. 589,515. (No model.)

*To all whom it may concern:*

Be it known that I, JACOB K. QUICK, a citizen of the United States, and a resident of Port Jervis, in the county of Orange and State of New York, have invented certain new and useful Improvements in Can-Openers, of which the following is a specification, reference being had to the accompanying drawings, forming a part thereof, in which similar letters of reference indicate corresponding parts.

This invention relates to devices for cutting out the heads of cans; and the object thereof is to provide an improved device of this class by means of which the circular head of a can may be quickly and easily cut out, and whereby the head of a can which is angular in form or square in cross-section may also be removed.

The invention is fully disclosed in the following specification, of which the accompanying drawings form a part, in which—

Figure 1 is a plan view of my improved can-opener; Fig. 2, a side view thereof, and Fig. 3 a section on the line 3 3.

In the practise of my invention I provide a can-opener which comprises a handle A, which is preferably composed of a flat bar of metal which is provided with a central longitudinal slot $a$, and one end of which is extended, as shown at $a^2$, and provided with a projecting point or prong $a^3$, which is formed on an angular arm $a^4$, which projects at right angles to the handle A, and the point or prong $a^3$ projects at right angles to the arm $a^4$ and parallel with the handle.

The handle A is provided at the end opposite the point or prong $a^3$ with a segmentally-curved jaw or head B, which is provided on its inner side with a semicircular cavity or recess $b$, and mounted on the under side of the handle is a plate D, which is provided at its inner end with a depending blade $d$, which is pointed and sharpened on both sides, and said plate D is provided at its outer end with a curved projecting blade $d^2$, which is serrated or provided with teeth on the side thereof adjacent to the segmental jaw B of the handle A, as shown at $d^3$, and the blade $d^2$ is also pointed.

The plate D is connected with the handle A by means of a screw-threaded bolt $d^4$, which projects through the slot $a$, and on which is mounted a set nut or bur E, and the operation will be readily understood from the foregoing description when taken in connection with the accompanying drawings and the following statement thereof.

When it is desired to cut out the head of a circular can, the plate D is adjusted to correspond with the diameter of the head and the point or prong $a^3$ is forced through the center thereof and the handle A depressed, so that the arm $a^4$ will serve as a pivot, and the blade $d$ is inserted through the head of the can adjacent to the outer edge thereof, and the handle A is turned around the head of the can, and in this operation the head will be cut out.

When it is desired to cut out the head of a can which is angular in cross-section, the plate D is moved outwardly into the position shown in Figs. 1 and 2 and firmly secured in place by the nut or bur E, and the point of the blade $d^2$ is forced through the head of the can adjacent to the side thereof, and then by using the jaw B of the handle as a fulcrum the blade $d^2$ is passed around the head of the can, the handle A being raised and lowered so as to cut out said head, and the side of the blade $d^2$ opposite the teeth $d^3$ may be provided with a cutting-edge, and either edge of said blade may be employed. If the side of the blade $d^2$, which is provided with the teeth $d^3$, is employed for cutting out the head of the can, the device after the point of the blade $d^2$ has been forced through the head of the can will be simply shoved forwardly, in which operation the end of the segmental jaw B of the handle is pressed on the head of the can, as will be readily understood, and said head will be cut out by the blade $d^2$.

This device is perfectly adapted to accomplish the result for which it is intended, and it is evident that changes in and modifications of the construction herein described may be made without departing from the spirit of my invention or sacrificing its advantages; and, Having fully described my invention, I claim as new and desire to secure by Letters Patent—

1. A can-opener comprising a bar as A, having a longitudinal slot formed therein, and being provided with an angular projecting prong at one end, and with a segmental head or jaw at the other, and a plate which is secured to one side or the bottom thereof, by means of a screw-threaded bolt which passes through said slot and on which is mounted a set nut or bur, the inner end of said plate being provided with a depending or angular blade and the outer end being provided with a curved projecting blade, substantially as shown and described.

2. A can-opener comprising a bar as A, having a longitudinal slot formed therein, and being provided with an angular projecting prong at one end, and with a segmental head or jaw at the other, and a plate which is secured to one side or the bottom thereof, by means of a screw-threaded bolt which passes through said slot and on which is mounted a set nut or bur the inner end of said plate being provided with a depending or angular blade and the outer end being provided with a curved projecting blade, said curved projecting blade being provided with serrations or teeth on the side adjacent to the jaw or head of the handle, substantially as shown and described.

3. A can-opener comprising a bar as A, having a longitudinal slot formed therein, and being provided with an angular projecting prong at one end, and with a segmental head or jaw at the other, and a plate which is secured to one side or the bottom thereof, by means of a screw-threaded bolt which passes through said slot and on which is mounted a set nut or bur the inner end of said plate being provided with a depending or angular blade and the outer end being provided with a curved projecting blade, said curved projecting blade being provided with serrations or teeth on the side adjacent to the jaw or head of the handle, and with a cutting edge on its opposite side, substantially as shown and described.

In testimony that I claim the foregoing as my invention I have signed my name, in presence of the subscribing witnesses, this 17th day of April, 1896.

JACOB K. QUICK.

Witnesses:
CHAS. C. SHEARE,
ANTHONY FELL.